(12) United States Patent
Nishio

(10) Patent No.: US 11,623,391 B2
(45) Date of Patent: Apr. 11, 2023

(54) THREE-DIMENSIONAL SHAPING DEVICE AND MANUFACTURING METHOD FOR THREE-DIMENSIONAL SHAPED OBJECT

(71) Applicant: MIMAKI ENGINEERING CO., LTD., Nagano (JP)

(72) Inventor: Keita Nishio, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 398 days.

(21) Appl. No.: 16/742,894

(22) Filed: Jan. 14, 2020

(65) Prior Publication Data

US 2020/0230879 A1   Jul. 23, 2020

(30) Foreign Application Priority Data

Jan. 18, 2019 (JP) .............................. JP2019-006544

(51) Int. Cl.
| | |
|---|---|
| *B29C 64/188* | (2017.01) |
| *B29C 64/209* | (2017.01) |
| *B29C 64/40* | (2017.01) |
| *B33Y 30/00* | (2015.01) |
| *B33Y 40/20* | (2020.01) |
| *B33Y 10/00* | (2015.01) |

(52) U.S. Cl.
CPC .......... *B29C 64/188* (2017.08); *B29C 64/209* (2017.08); *B29C 64/40* (2017.08); *B33Y 10/00* (2014.12); *B33Y 30/00* (2014.12); *B33Y 40/20* (2020.01)

(58) Field of Classification Search
CPC ..... B29C 63/188; B29C 64/40; B29C 64/112; C29C 64/209; B33Y 40/20
See application file for complete search history.

(56) References Cited

U.S. PATENT DOCUMENTS

| | | | | |
|---|---|---|---|---|
| 2016/0192741 A1* | 7/2016 | Mark | ..................... | B33Y 10/00 36/43 |
| 2016/0311165 A1* | 10/2016 | Mark | .................... | B29C 64/386 |

FOREIGN PATENT DOCUMENTS

| | | |
|---|---|---|
| JP | 2016026915 | 2/2016 |
| JP | 2017024410 | 2/2017 |
| JP | 2018083360 | 5/2018 |

OTHER PUBLICATIONS

"Notification of Reasons for Rejection of Japan Counterpart Application", dated Jul. 5, 2022, with English translation thereof, p. 1-p. 12.

* cited by examiner

*Primary Examiner* — Philip C Tucker
*Assistant Examiner* — Evan T Hulting
(74) *Attorney, Agent, or Firm* — JCIPRNET

(57) ABSTRACT

In a three-dimensional shaping device, a support layer includes a dissolution removal target region removed by dissolving in the predetermined liquid and formed at a periphery of at least one part of the three-dimensional shaped object, and a non-dissolution removal target region removed through a method other than dissolution by the predetermined liquid and formed at a periphery of at least one part of the dissolution removal target region. At least one part of the support layer other than the dissolution removal target region is a different material region which is a region formed using a material different from the dissolution removal target region, and is formed at a position of at least one part of the periphery of the dissolution removal target region to indicate a position of a boundary between the dissolution removal target region and the non-dissolution removal target region.

9 Claims, 8 Drawing Sheets

THREE-DIMENSIONAL SHAPING DEVICE AND MANUFACTURING METHOD FOR THREE-DIMENSIONAL SHAPED OBJECT

CROSS REFERENCE TO RELATED APPLICATIONS

This application claims the priority benefit of Japanese Patent Application No. 2019-006544, filed on Jan. 18, 2019. The entirety of the above-mentioned patent application is hereby incorporated by reference herein and made a part of this specification.

TECHNICAL FIELD

The present disclosure relates to a three-dimensional shaping device that shapes a three-dimensional shaped object and a manufacturing method for the three-dimensional shaped object.

DESCRIPTION OF THE BACKGROUND ART

For example, a technique of a three-dimensional shaping device that shapes a three-dimensional shaped object through an inkjet layered shaping method is conventionally known (see e.g., Japanese Unexamined Patent Publication No. 2016-26915, i.e., Patent Literature 1). The three-dimensional shaping device using the inkjet layered shaping method includes a shaping material inkjet head that ejects a shaping material used for shaping a three-dimensional shaped object, specifically, ink droplets of ink through an inkjet method, and a support material inkjet head that ejects ink droplets of a support material ink, which becomes a material of a support layer that supports the three-dimensional shaped object, through the inkjet method. Furthermore, the surface of a three-dimensional shaped object may be colored with color ink. Specifically, the three-dimensional shaping device further includes a plurality of color ink inkjet heads that eject ink droplets of inks which are color materials containing curable resin and are of colors different from each other through an inkjet method, so that the surface of the three-dimensional shaped object can be colored, for example, in full color.

FIG. 8A shows a preparation-shaped object 140 shaped using the shaping material ink and the support material ink to shape a three-dimensional shaped object 160. The three-dimensional shaped object 160 shaped with the shaping material ink is supported by a support layer 150 shaped with the support material ink. The support layer 150 must be removed in order to take out and complete the three-dimensional shaped object 160.

FIG. 8B shows a mode in which the support layer 150 is roughly removed (rough removal) in order to take out the three-dimensional shaped object 160 from the preparation-shaped object 140.

Since the support layer 150 is more fragile than the shaping material, the support layer 150 can be removed with a technique using a knife or a spoon. The three-dimensional shaped object 160, which is a final resultant, as shown in FIG. 8C can be obtained by after removing most of the support layer 150, dissolving and washing it with a predetermined liquid, specifically water.

Patent Literature 1: Japanese Unexamined Patent Publication No. 2016-26915

SUMMARY

However, some of the three-dimensional shaped objects 160 have delicate parts where the thinness of a part shaped with the shaping material ink is a few millimeters. In handling such a three-dimensional shaped object 160, extra force may be applied to the delicate parts and such part may be damaged when roughly removing the support layer 150 with a technique (see FIG. 8D).

Since the support material ink that forms the support layer dissolves in water, the entire support layer can be removed by washing entirely with water after shaping the preparation-shaped object. However, when the capacity of the preparation-shaped object is large, there is a drawback in that it takes a lot of time until the support layer is completely dissolved in water.

In view of such a situation, the present disclosure provides a three-dimensional shaping device capable of leaving a support layer at a periphery of a three-dimensional shaped object by a thickness that makes it difficult to apply an excessive force with a technique of rough removal with respect to the three-dimensional shaped object, and a manufacturing method for the three-dimensional shaped object.

(1) The present disclosure provides a three-dimensional shaping device for shaping a three-dimensional shaped object, the three-dimensional shaping device including a head portion that ejects a material used for shaping the three-dimensional shaped object; and a controller that controls the operation of the head portion; where the head portion ejects, as the material, a shaped object material which is the material used to form the three-dimensional shaped object, and a support material which is a material used to form a support layer that supports at least one part of the three-dimensional shaped object being shaped; the support material is a material that dissolves in a predetermined liquid; the controller causes the head portion to form the shaped object using the shaped object material, and to form the support layer using the support material; the support layer includes, a dissolution removal target region which is a region to be removed by dissolving in the predetermined liquid, the dissolution removal target region being formed at a periphery of at least one part of the three-dimensional shaped object, and a non-dissolution removal target region which is a region to be removed through a method other than dissolution by the predetermined liquid, the non-dissolution removal target region being formed at a periphery of at least one part of the dissolution removal target region; and at least one part of the support layer other than the dissolution removal target region is a different material region which is a region formed using a material different from the dissolution removal target region, and is formed at a position of at least one part of the periphery of the dissolution removal target region to indicate a position of a boundary between the dissolution removal target region and the non-dissolution removal target region.

In the disclosure according to (1), since the position of the boundary between the dissolution removal target region and the non-dissolution removal target region is indicated by the different material region, an excellent effect is obtained in that, when removing the non-dissolution removal target region in the support layer by applying a physical force with a technique, for example, rough removal can be performed while leaving the support layer thick enough to prevent an excessive force from being applied to the three-dimensional shaped object at the periphery of the three-dimensional shaped object, and the delicate three-dimensional shaped object can be taken out from the support layer and completed in a short time.

(2) The present disclosure provides the three-dimensional shaping device according to (1), where the different material region is formed in a color different from the dissolution removal target region so that a boundary between the dissolution removal target region and the non-dissolution removal target region is in a visible state.

In the disclosure according to (2), since the colors of the dissolution removal target region which is a support layer formed at the periphery of the three-dimensional shaped object so that excessive force is not applied to the three-dimensional shaped object and the different material region are different, for example, when roughly removing the different material region with a technique, the position of the dissolution removal target region can be distinguished and left behind. As a result, an excellent effect is obtained in that an excessive force is less likely to be applied to the three-dimensional shaped object, which is thereafter washed with water to remove the dissolution removal target region so that a delicate three-dimensional shaped object can be completed in a short time.

(3) The present disclosure provides the three-dimensional shaping device according to (2), where the head portion ejects the material having a color different from the support material as any material other than the support material; and the different material region is a region formed in a color different from the dissolution removal target region using a material having a color different from the support material, and is formed at a position between the dissolution removal target region and the non-dissolution removal target region as a region different from both the dissolution removal target region and the non-dissolution removal target region.

In the disclosure according to (3), the different material region is formed in a color different from the dissolution removal target region, and is formed as a region different from the dissolution removal target region and the non-dissolution removal target region at the position between the dissolution removal target region and the non-dissolution removal target region, so that for example, when roughly removing up to the different material region with a technique, the dissolution removal target region can be distinguished and left behind. As a result, an excellent effect is obtained in that an excessive force is less likely to be applied to the three-dimensional shaped object, which is thereafter washed with water to remove the dissolution removal target region so that a delicate three-dimensional shaped object can be completed in a short time.

(4) The present disclosure provides the three-dimensional shaping device according to (3), where the different material region is formed in a color different from the dissolution removal target region by being formed using a material having a color different from the support material without using the support material.

When the three-dimensional shaped object and the support layer are separated during shaping or immediately after shaping, the three-dimensional shaped object may be warped and deformed. In the disclosure according to (4), if the shaping material ink having a color different from that of the dissolution removal target region is used, for example, as the different material region at a position between the dissolution removal target region and the non-dissolution removal target region, an excellent effect is obtained in that the three-dimensional shaped object covered with the different material region is less likely to be warped since the shaping material ink is harder than the support material ink.

(5) The present disclosure provides the three-dimensional shaping device according to (3) or (4), where the different material region is a film-like region formed along at least one part of the outer side of the dissolution removal target region; and the non-dissolution removal target region is formed to sandwich the different material region with the dissolution removal target region.

In the disclosure according to (5), when the support layer is roughly removed by physical scraping, for example, with a technique, the film-like different material region can be used as a mark, and thus an excellent effect is obtained in that rough removal can be carried out while leaving the support layer thick enough to prevent an excessive force from being applied to the three-dimensional shaped object with a technique at the periphery of the three-dimensional shaped object, and a delicate three-dimensional shaped object can be taken out from the support layer and completed in a short time.

(6) The present disclosure provides the three-dimensional shaping device according to (2), where the different material region is at least one part of the non-dissolution removal target region.

In the disclosure according to (6), since the different material region is at least one part of the non-dissolution removal target region, it has a color different from the dissolution removal target region and thus may serve as a mark, whereby, for example, when roughly removing up to the different material region with a technique, the position of the dissolution removal target region can be distinguished and left behind. As a result, an excellent effect is obtained in that an excessive force is less likely to be applied to the three-dimensional shaped object, which is thereafter washed with water to remove the dissolution removal target region so that a delicate three-dimensional shaped object can be completed in a short time.

(7) The present disclosure provides the three-dimensional shaping device according to (6), where the head portion ejects the material having a color different from the support material as any material other than the support material; and the different material region is formed in a color different from the dissolution removal target region by being formed using the support material and a material having a color different from the support material.

In the disclosure according to (7), the different material region is formed with a color from the dissolution removal target region using the support material and a material other than the support material having a color different from the support material, so that the boundary between the non-dissolution removal target region and the dissolution removal region becomes clear, and for example, when roughly removing up to the different material region with a technique, the position of the dissolution removal target region can be distinguished and left behind. As a result, an excellent effect is obtained in that an excessive force is less likely to be applied to the three-dimensional shaped object, which is thereafter washed with water to remove the dissolution removal target region so that a delicate three-dimensional shaped object can be completed in a short time.

(8) The present disclosure provides the three-dimensional shaping device according to any one of (1) to (7), where the non-dissolution removal target region is a region removed by bringing an object harder than the non-dissolution removal target region into contact with the non-dissolution removal target region and applying a physical force.

In the disclosure according to (8), the non-dissolution removal target region can be removed in a short time from the support layer covering the three-dimensional shaped object, and as a result, an excellent effect is obtained in that a delicate three-dimensional shaped object can be completed in a short time.

(9) The present disclosure provides a manufacturing method for a three-dimensional shaped object for manufacturing a three-dimensional shaped object, the manufacturing method including a shaping step of causing a head portion, which ejects a material used for shaping the three-dimensional shaped object, to perform shaping of the shaped object; where the head portion ejects, as the material, a shaped object material which is the material used for forming the three-dimensional shaped object and a support material which is a material used for forming a support layer that supports at least a part of the three-dimensional shaped object being shaped; the support material is a material that dissolves in a predetermined liquid; in the shaping step, the head portion is caused to form the shaped object using the shaped object material, and to form the support layer using the support material; the support layer includes a dissolution removal target region which is a region to be removed by dissolving in the predetermined liquid, the dissolution removal target region being formed at a periphery of at least one part of the three-dimensional shaped object, and a non-dissolution removal target region which is a region to be removed through a method other than dissolution by the predetermined liquid, the non-dissolution removal target region being formed at a periphery of at least one part of the dissolution removal target region; and at least one part of the support layer other than the dissolution removal target region is a different material region which is a region formed using a material different from the dissolution removal target region, and is formed at a position of at least one part of the periphery of the dissolution removal target region to indicate a position of a boundary between the dissolution removal target region and the non-dissolution removal target region.

In the disclosure according to (9), since the position of the boundary between the dissolution removal target region and the non-dissolution removal target region is indicated by the different material region, an excellent effect is obtained in that when removing the non-dissolution removal target region in the support layer by applying a physical force with a technique, for example, rough removal can be performed while leaving the support layer thick enough to prevent an excessive force from being applied to the three-dimensional shaped object at the periphery of the three-dimensional shaped object, and the delicate three-dimensional shaped object can be taken out from the support layer and completed in a short time.

(10) The present disclosure provides the manufacturing method for the three-dimensional shaped object according to claim(9), further including the steps of a non-dissolution removing step of removing the non-dissolution removal target region through a method other than dissolution by the predetermined liquid, the step being performed after the shaping step; and a dissolution removing step of removing the dissolution removal target region by dissolving the dissolution removal target region by the predetermined liquid, the step being performed after the non-dissolution removing step.

In the disclosure according to (10), an excellent effect is obtained in that an excessive force is less likely to be applied to the three-dimensional shaped object, which is thereafter dissolved and washed with a predetermined liquid to remove the dissolution removal target region, and a delicate three-dimensional shaped object can be completed in a short time.

(11) The present disclosure provides the manufacturing method for the three-dimensional shaped object according to (10), where the non-dissolution removing step is a step of removing the non-dissolution removal target region by bringing an object harder than the non-dissolution removal target region into contact with the non-dissolution removal target region and applying a physical force.

In the disclosure according to (11), the non-dissolution removal target region can be removed in a short time from the support layer covering the three-dimensional shaped object, and as a result, an excellent effect is obtained in that a delicate three-dimensional shaped object can be completed in a short time.

In the three-dimensional shaping device and the manufacturing method for the three-dimensional shaped object according to claims 1 to 11 of the present disclosure, the different material region can be employed as a mark when, for example, removing with a technique the non-dissolution removal target region in the support layer, and thus an excellent effect is obtained in that rough removal can be performed while leaving a support layer thick enough to prevent an excessive force from being applied to the three-dimensional shaped object with a technique and the like at the periphery of the three-dimensional shaped object as the dissolution removal target region and a delicate three-dimensional shaped object can be taken out from the support layer and completed in a short time.

DETAILED DESCRIPTION OF EMBODIMENTS

Figure 1A:
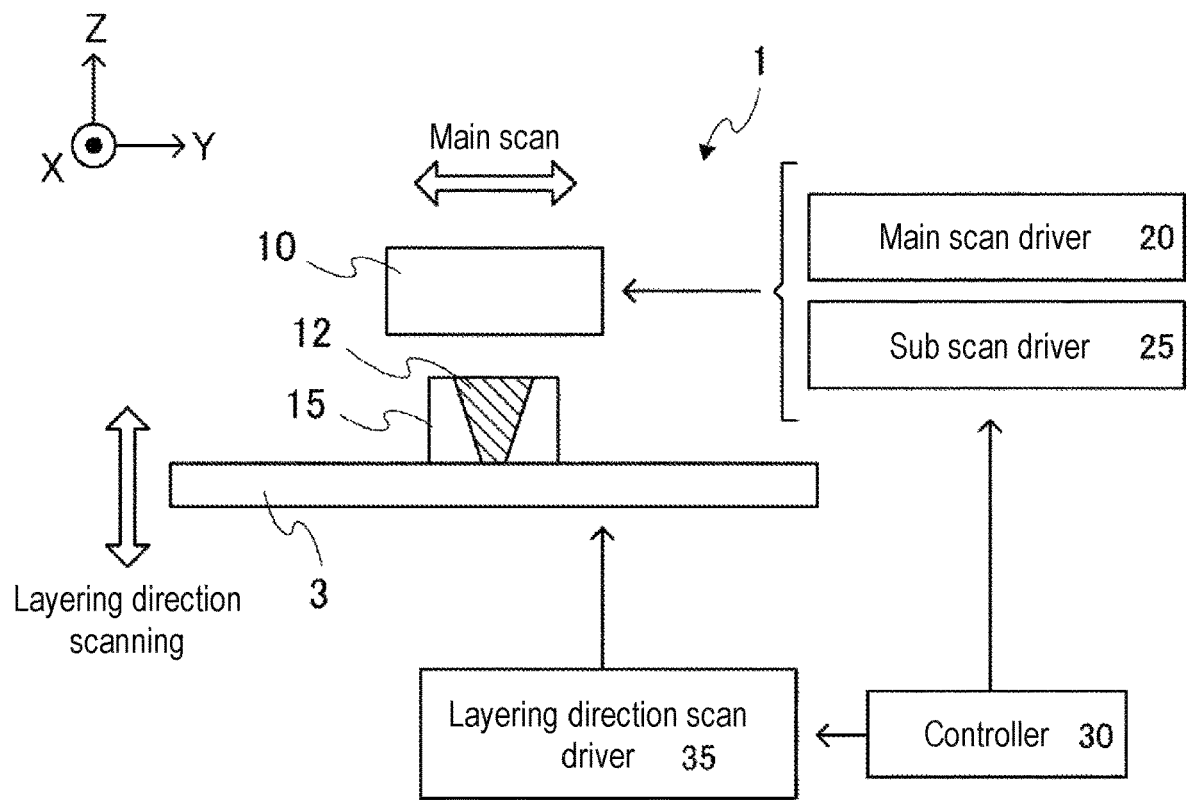
FIG. 1A is an explanatory view of a three-dimensional shaping device according to a first embodiment of the present disclosure.

Hereinafter, embodiments of the present disclosure will be described with reference to the accompanying drawings.

FIGS. 1A to 7 show one example of the embodiments of the disclosure, and portions denoted with the same reference numerals in the drawing indicate the same parts.

The three-dimensional shaping device 1 according to the embodiment of the present disclosure may have features same as or similar to a known three-dimensional shaping device other than the points particularly described. Specifically, the three-dimensional shaping device 1 may have features same as or similar to the known shaping device that performs three-dimensional shaping by ejecting droplets of ink or the like that is to become a material of a shaped object using an inkjet head. Furthermore, other than the illustrated configuration, the three-dimensional shaping device 1 may also include, for example, various types of configurations necessary for shaping, and the like of the three-dimensional shaped object.

FIG. 1A is an explanatory view of the three-dimensional shaping device 1 according to a first embodiment of the present disclosure.

The three-dimensional shaping device 1 according to the present embodiment is a shaping device (3D printer) that shapes a three-dimensional shaped object 12 through a layered shaping method. In this case, the layered shaping method is, for example, a method of shaping the three-dimensional shaped object 12 by overlapping a plurality of layers. The three-dimensional shaped object 12 is, for example, a stereoscopic three-dimensional structural object.

The three-dimensional shaping device 1 according to the first embodiment of the present disclosure includes a head portion 10 that ejects a material used for shaping a three-dimensional shaped object, and a controller 30 that controls the operation of the head portion 10. The head portion 10 ejects a shaped object material, which is a material used for forming the three-dimensional shaped object 12, and a support material, which is a material used for forming the support layer 15 that supports at least a part of the three-dimensional shaped object 12 being shaped (see FIG. 1A).

The support material is a material that dissolves in a predetermined liquid, and the controller 30 causes the head portion 10 to form the three-dimensional shaped object 12 using the shaped object material, and to form the support layer 15 using the support material.

The support layer 15 includes a dissolution removal target region 60 (see FIG. 2B described later) formed at a periphery of at least one part of a three-dimensional shaped object 70 (see FIG. 2B described later), the region being removed by being dissolved in a predetermined liquid, for example, water, and a non-dissolution removal target region 50 formed at a periphery of at least one part of the dissolution removal target region 60 (see FIG. 2B described later), the region being removed through a method other than dissolution by a predetermined liquid (e.g., water).

At least one part of a part other than the dissolution removal target region 60 in the support layer is a different material region 50 which is a region formed using a material different from the dissolution removal target region 60, where the position of the boundary between the dissolution removal target region 60 and the non-dissolution removal target region 50 is indicated by forming the different material region 50 at a position of at least one part in the periphery of the dissolution removal target region 60.

Figure 2A:
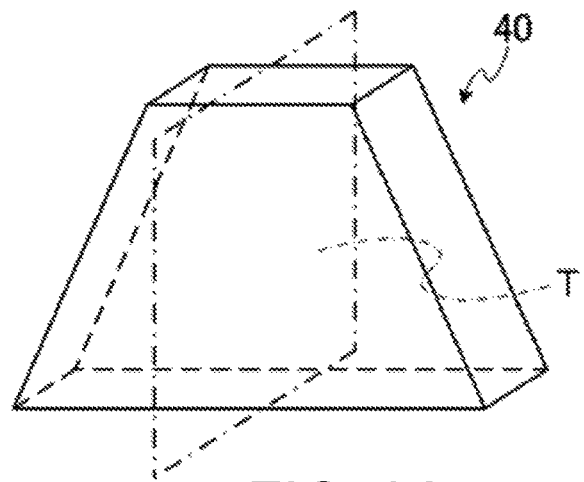
FIG. 2A is a perspective explanatory view of a preparation-shaped object used when the three-dimensional shaping device according to the first embodiment of the present disclosure shapes a three-dimensional shaped object.
Figure 2B:
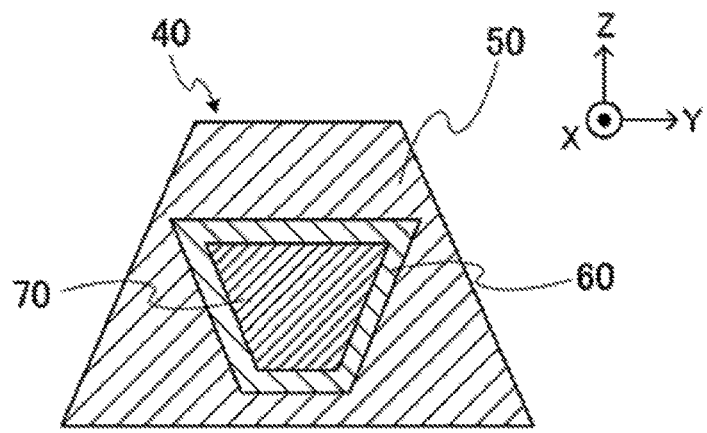
FIG. 2B is a cross-sectional view in a plane T of the preparation-shaped object.
Figure 2C:
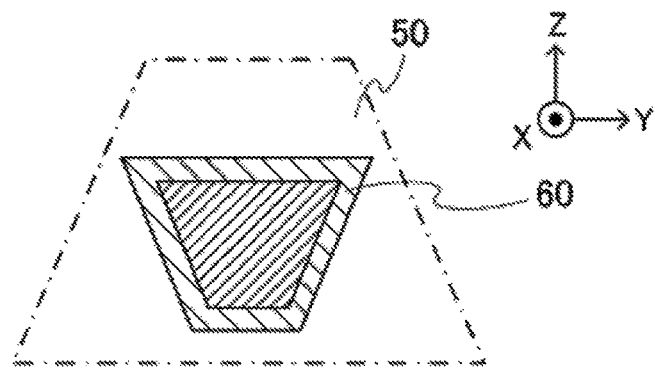
FIG. 2C is a cross-sectional view of the preparation-shaped object in a state in which the non-dissolution removal target region is removed.

In FIG. 2B, which will be described later, the different material region 50 may indicate the same target as the non-dissolution removal target region 80.

A specific configuration of the three-dimensional shaping device 1 will be described in more detail.

The three-dimensional shaping device 1 includes a shaping table 3 having a substantially flat upper surface on which the three-dimensional shaped object 12 is shaped, a plurality of inkjet heads 16 (see FIG. 1B) that eject ink, for example, which is a material for three-dimensional shaping provided in the head portion 10, a main scan driver 20 that causes the inkjet head 16 to perform a main scan of ejecting ink while relatively moving with respect to the three-dimensional shaped object 12 being shaped in a main scanning direction (Y direction in the drawing) set in advance, a layering direction scan driver 35 that performs a layering direction scanning of relatively moving the shaping table 3 with respect to the inkjet head 16 in the layering direction which is the direction of layering ink, a flattening device 5 (see FIG. 1B) that flattens the ejected and layered ink, and a controller 30 that controls the shaping of the three-dimensional shaped object 12.

Specifically, the shaping table 3 is a table-shaped member that supports the three-dimensional shaped object 12 being shaped, and is disposed at a position facing the inkjet head 16 (see FIG. 1B) in the head portion 10.

The head portion 10 includes a portion that ejects a droplet to become the material of the three-dimensional shaped object 12, and ejects an ink droplet of ink that cures according to a predetermined condition and cures the ink to shape each layer configuring the three-dimensional shaped object 12 in an overlapping manner. Furthermore, in the present example, for example, an ultraviolet curable ink that cures by irradiation of an ultraviolet light is used for the ink. In this case, the ink is, for example, a functional liquid. Furthermore, in the present example, for example, ink can be considered as liquid, and the like ejected from the inkjet head 16 (see FIG. 1B). The inkjet head is, for example, an ejection head that ejects droplet of ink (ink droplet) through the inkjet method.

Figure 1B:
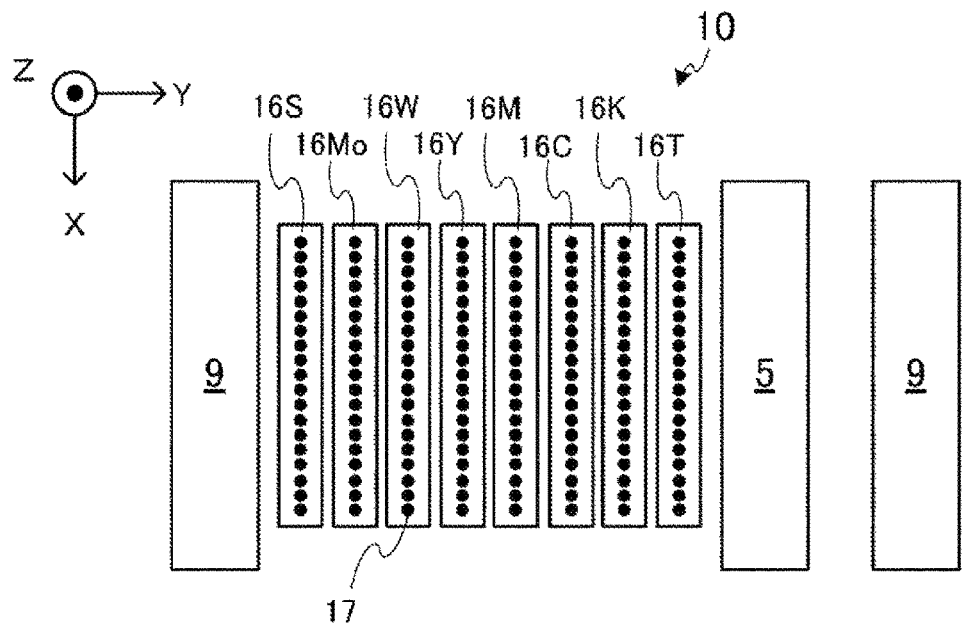
FIG. 1B is explanatory view of a head.

In the present embodiment, the head portion 10 includes a plurality of inkjet heads and an ultraviolet light source 9 (see FIG. 1B). Furthermore, the head portion 10 further ejects the material of the support layer 15 in addition to the material of the three-dimensional shaped object 12. In this case, the support layer 15 is, for example, a layered structural object that supports the three-dimensional shaped object 12 by surrounding the outer periphery of the three-dimensional shaped object 12 being shaped.

At the time of the main scan of the present embodiment, the main scan driver 20 further performs the drive of the ultraviolet light source 9 in the head portion 10. More specifically, for example, the main scan driver 20 lights the ultraviolet light source 9 at the time of the main scan to cure the ink that landed on a surface-to-be-shaped of the three-dimensional shaped object 12. The surface-to-be-shaped of the three-dimensional shaped object 12 is, for example, a surface where a next layer of ink is formed by the head portion 10.

A sub scan driver 25 is a driver that causes the head portion 10 to carry out a sub scan (X scanning). In this case, to cause the head portion 10 to perform the sub scan means, for example, to cause the inkjet head 16 of the head portion 10 to perform the sub scan. The sub scan is, for example, an operation of relatively moving with respect to the three-dimensional shaped object 12 being shaped in a sub scanning direction orthogonal to the main scanning direction. More specifically, the sub scan is, for example, an operation of relatively moving with respect to the three-dimensional shaped object 12 being shaped in the sub scanning direction by a feed amount set in advance.

In the present embodiment, the sub scan driver 25 causes the head portion 10 to perform the sub scan between main scans. Furthermore, for example, the sub scan driver 25 may cause the head portion 10 to perform the sub scan by fixing the position of the head portion 10 in the sub scanning direction and moving the shaping table 3. Furthermore, the sub scan driver 25 may cause the head portion 10 to perform the sub scan by fixing the position of the shaping table 3 in the sub scanning direction and moving the head portion 10.

The controller 30 includes a CPU, a RAM, a ROM, and the like, and executes various types of controls. The CPU is a so-called central processing unit, and various programs are executed to realize various functions. The RAM is used as a work area and a storage area of the CPU, and the ROM stores an operating system and programs executed by the CPU.

Specifically, the controller 30 controls the shaping operation in the three-dimensional shaping device 1 by controlling each portion of the three-dimensional shaping device 1. More specifically, the controller 30 controls each portion of the three-dimensional shaping device 1 based on, for example, shape information, color information and the like of the three-dimensional shaped object 12 to shape. According to the present embodiment, the three-dimensional shaped object 12 can be appropriately shaped.

FIG. 1B is an explanatory view of the head portion 10 and shows an example of a more detailed configuration of the head portion 10. In the present embodiment, the head portion 10 includes a plurality of color ink inkjet heads 16Y, 16M, 16C, and 16K (hereinafter referred to as 16Y to K), a shaping material inkjet head 16Mo, a white ink inkjet head 16W, a clear ink inkjet head 16T, a support material inkjet head 16S, a plurality of ultraviolet light sources 9, and a flattening device 5.

The color ink inkjet heads 16Y to K, the shaping material inkjet head 16Mo, the white ink inkjet head 16W, the clear ink inkjet head 16T, and the support material inkjet head 16S are inkjet heads that eject ink droplets through the inkjet method. In the present embodiment, the plurality of color ink inkjet heads 16Y to K, the shaping material inkjet head 16Mo, the white ink inkjet head 16W, the clear ink inkjet head 16T, and the support material inkjet head 16S are inkjet heads that eject ink droplets of ultraviolet-curable ink, and are disposed side by side in the main scanning direction (Y direction in FIG. 1B) with the respective positions in the sub scanning direction (X direction in FIG. 1B) (see FIG. 1A) aligned.

As the color ink inkjet heads 16Y to K, the shaping material inkjet head 16Mo, the white ink inkjet head 16W, the clear ink inkjet head 16T, and the support material inkjet head 16S, for example, a known inkjet head can be suitably used. Furthermore, such inkjet heads each includes a nozzle row, in which a plurality of nozzles 17 are lined in the sub scanning direction, on a surface facing the shaping table 3. In this case, the nozzle 17 of each inkjet head ejects ink droplets in a direction toward the shaping table 3.

Furthermore, the arrangement of the color ink inkjet heads 16Y to K, the shaping material inkjet head 16Mo, the white ink inkjet head 16W, the clear ink inkjet head 16T, and the support material inkjet head 16S is not limited to the illustrated configuration, and may be changed variously. For example, some inkjet heads may be arranged to be shifted in position in the sub scanning direction from other inkjet heads. Furthermore, the head portion 10 may further include, for example, an inkjet head for colors such as light color of each color, R (red) G (green) B (blue), orange and the like.

The color ink inkjet heads 16Y to K are inkjet heads for coloring that respectively ejects ink droplets of color inks of different colors from each other. In the present example, the color ink inkjet heads 16Y to K eject ink droplets of ultraviolet curable ink of each color of Y (yellow), M (magenta), C (cyan), and K (black).

The shaping material inkjet head 16Mo is an inkjet head that ejects ink droplets of ink used for shaping the inside of a shaped object, and for example, ejects ink droplets of ink used for shaping a region where coloring is not performed in the shaped object 12. In the present embodiment, the shaping material inkjet head 16Mo ejects ink droplets of the shaping ink of a predetermined color. The shaping ink may be, for example, an ink dedicated to shaping. In the present example, the shaping ink is an ink having a color different from each color of CMYK. It is conceivable to use, for example, white ink, clear ink, or the like as the shaping ink.

The white ink inkjet head 16W is an inkjet head that ejects ink droplets of white (W color) ink. Furthermore, the clear ink inkjet head 16T is an inkjet head that ejects ink droplets of clear ink. In this case, the clear ink is, for example, a colorless transparent ink.

The ink of each color is an example of a material used for shaping.

The support material inkjet head 16S is an inkjet head that ejects ink droplets containing the material of the support layer 15 (see FIG. 1A). For example, a water-soluble material that can be dissolved in water after the shaping of the shaped object 12 can be suitably used for the material of the support layer 15. In this case, a material which cure degree by the ultraviolet light is weaker and which can be easily decomposed than the material configuring the shaped object 12 is preferably used. More specifically, for example, a known material for the support layer can be suitably used for the material of the support layer 15.

The support layer 15 is a layered structural object formed under the overhang shaped part at the time of shaping, for example, when shaping the three-dimensional shaped object 12 having the overhang shape. The support layer 15 is formed as necessary at the time of shaping of the three-dimensional shaped object 12 and removed after the completion of the shaping. In the present embodiment, the support material ink for forming the support layer 15 is not used only for shaping the three-dimensional shaped object 12 having an overhang shape, but is also used for forming the base covering the surface roughness of the shaping table 3.

It is assumed that the shaping material inkjet head 16Mo is present, but the shaping material inkjet head 16Mo may not be provided.

The flattening roller 5, which is a flattening device, is an example of a flattening portion for flattening a layer of ink formed during shaping of the three-dimensional shaped object 12 or the like. The flattening roller 5 is disposed between the arrangement of the inkjet heads and the ultraviolet light source 9. Thus, the flattening roller 5 is arranged side by side in the main scanning direction (Y direction in the figure) with the positions in the sub scanning direction (X direction in the drawing) aligned with respect to the arrangement of the inkjet heads 16. Furthermore, in this case, for example, the flattening roller 5 flattens the layer of ink by making contact with a surface of the layer of ink and removing one part of the ink before curing at the time of the main scan.

In the present embodiment, the head portion 10 includes only one flattening roller 5. In this case, the flattening roller 5 is arranged, for example, between the ultraviolet light source 9 on one end side in the head portion 10 and the arrangement of the inkjet heads. Furthermore, in this case, the main scan driver 20 (see FIG. 1A) at least causes the head portion 10 to carry out the main scan in a direction (one direction in the main scanning direction) in which the flattening roller 5 becomes the backward side than the arrangement of the inkjets. Then, the flattening roller 5 flattens the layer of ink during the main scan in this direction.

The plurality of ultraviolet light sources 9 have a configuration for curing the ink, and generate an ultraviolet light for curing the ultraviolet curable ink. For example, UVLED (ultraviolet LED) and the like can be suitably used for the ultraviolet light source 9. Furthermore, consideration is also made to use metal halide lamp, mercury lamp, and the like for the ultraviolet light source 9. In addition, in the present embodiment, each of the plurality of ultraviolet light sources 9 is arranged on one end side and the other end side in the main scanning direction in the head portion 10 to sandwich the arrangement of inkjet heads (color ink inkjet heads 16Y to K, shaping material inkjet head 16Mo, white ink inkjet head 16W, clear ink inkjet head 16T, support material inkjet head 16S) in between.

A specific shaping control content in the three-dimensional shaping device 1 according to the first embodiment of the present disclosure will be described with reference to FIGS. 2A to 2D.

The three-dimensional shaping device 1 according to the first embodiment of the present disclosure is a three-dimensional shaping device that uses curable resin, which is resin that cures according to a predetermined condition, to shape a three-dimensional shaped object 70 through a layered shaping method, the three-dimensional shaping device including a plurality of shaping material inkjet heads 16Mo, which eject through an inkjet method ink droplets of shaping material inks to become the material of the three-dimensional shaped object 70 including the curable resin, the ink having different colors from each other; a curing portion for curing the curable resin, specifically an ultraviolet light source 9; a support material inkjet head 16S that ejects ink droplets of a support material ink to become the material of a support layer 15 for supporting the three-dimensional shaped object 12; and a controller 30 that controls the operation of the plurality of shaping material inkjet heads 16Mo, the support material inkjet head 16S, color ink inkjet heads 16Y to K which are inkjet heads for coloring that eject ink droplets of color inks having colors different from each other, and the curing portion (ultraviolet light source 9); where when shaping the three-dimensional shaped object 70, the controller 30 performs a control to shape a preparation-shaped object 40 including, in order from the inner side, a dissolution removal target region 60 which is an ink layer that is in contact with the three-dimensional shaped object 70 formed with the shaping material ink and in which the support material ink is layered to cover the three-dimensional shaped object with a predetermined thickness and a different material region 50 which is an ink layer that is in contact with the dissolution removal target region 60 and in which ink other than the support material ink is layered to cover the dissolution removal target region 60 with a predetermined thickness.

Here, curing according to a predetermined condition may mean curing by, for example, ultraviolet light irradiated from the ultraviolet light source 9 (see FIG. 1B). In addition, the curable resin which is a resin that cures according to a predetermined condition may be, for example, an ultraviolet curable resin that cures by being irradiated with ultraviolet light.

At this time, the different material region 50 is preferably formed of ink that is a material colored in a color different from the dissolution removal target region 60 by the three-dimensional shaping device 1. Specifically, it is considered that the different material region 50 is formed by simultaneously ejecting the shaping material ink having a color different from the support material ink and the support material ink, or by simultaneously ejecting a color ink having a color different from the support material ink and the support material ink.

In another modified embodiment, it is also conceivable that at least one part of the different material region 50 is formed with the support material ink having a color different from that of the dissolution removal target region 60 by the three-dimensional shaping device 1.

Furthermore, the three-dimensional shaping device 1 may shape the preparation-shaped object 40 further including a non-dissolution removal target region which is an ink layer in contact with the different material region and in which the support material ink is layered to cover the different material region with a predetermined thickness.

FIG. 2A is a perspective explanatory view of the preparation-shaped object 40 used when the three-dimensional shaped object 70 according to the first embodiment of the present disclosure is shaped. The preparation-shaped object 40 includes a three-dimensional shaped object 70 therein.

FIG. 2B is a cross-sectional view in a plane T of the preparation-shaped object 40. The preparation-shaped object 40 includes, in order from the inner side, the three-dimensional shaped object 70 formed with the shaping material ink to become the material of the three-dimensional shaped object 70 including the curable resin, the dissolution removal target region 60 which is an ink layer in contact with the three-dimensional shaped object 70 and in which the support material ink is layered to cover the three-dimensional shaped object 70 with a predetermined thickness, and the different material region 50 which is an ink layer in contact with the dissolution removal target region 60 to cover the dissolution removal target region 60 with a predetermined thickness and in which ink to become the material of the different material region 50 having a color different from the dissolution removal target region 60 and indicating the position of the dissolution removal target region 60 is layered.

Specifically, as the different material region 50 is formed in a color different from that of the dissolution removal target region 60, the boundary between the dissolution removal target region 60 and the different material region 50 is in a visible state.

The different material region 50 may be a region that is removed by a method other than dissolution by a predetermined liquid and indicates the same region as the non-dissolution removal target region 80 (see e.g., FIG. 3B described later) formed at the periphery of at least one part of the dissolution removal target region.

The three-dimensional shaped object 70, which is the final resultant, is obtained by removing the different material region 50 from the preparation-shaped object 40 (see FIG.

Figure 2D:
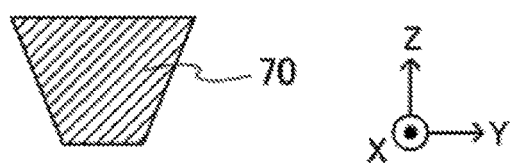
FIG. 2D is a cross-sectional view of the three-dimensional shaped object serving as the final resultant after the dissolution removal target region is removed.

2C), and dissolving and removing the dissolution removal target region 60 with a predetermined liquid, specifically water (see FIG. 2D).

Figure 3A:
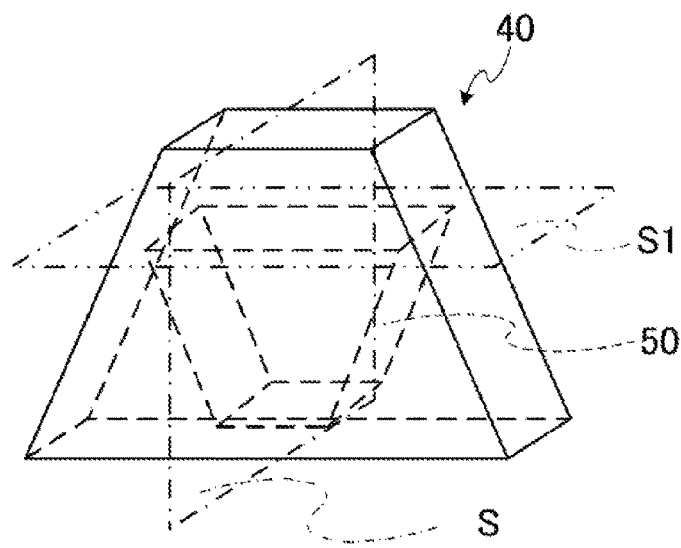
FIG. 3A is a perspective explanatory view of a preparation-shaped object used when the three-dimensional shaping device according to a second embodiment of the present disclosure shapes a three-dimensional shaped object.

FIG. 3A is a perspective explanatory view of a preparation-shaped object 40 including a three-dimensional shaped object 70 shaped by a three-dimensional shaping device 1 according to a second embodiment of the present disclosure.

Figure 3B:
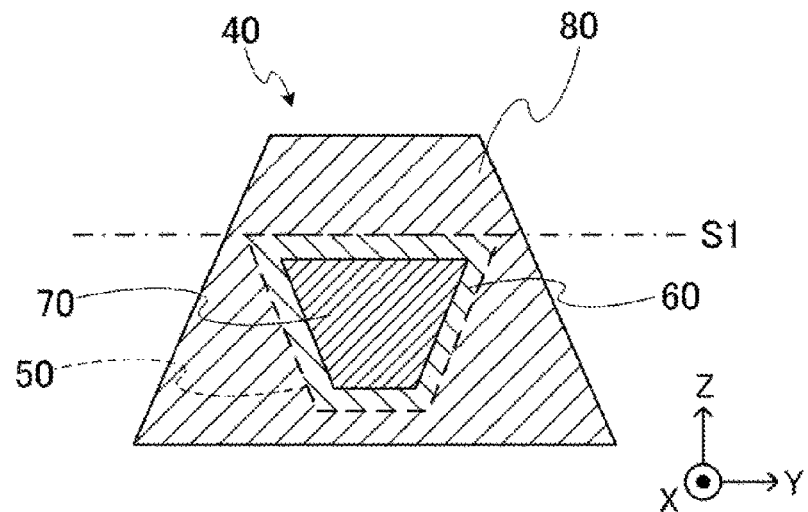
FIG. 3B is a cross-sectional view in a plane S of the preparation-shaped object.

FIG. 3B is a cross-sectional view in a plane S of the preparation-shaped object 40. The preparation-shaped object 40 shaped by the three-dimensional shaping device 1 according to a second embodiment of the present disclosure is shaped through the layered shaping method using the curable resin which is resin that cures according to a predetermined condition, and includes, in order from the inner side, the three-dimensional shaped object 70 formed with the shaping material ink to become the material of the three-dimensional shaped object 70 including the curable resin, the dissolution removal target region 60 which is an ink layer in contact with the three-dimensional shaped object 70 and in which the support material ink is layered to cover the three-dimensional shaped object 70 with a predetermined thickness, and the different material region 50 which is in contact with the dissolution removal target region 60 to cover the dissolution removal target region 60 with a predetermined thickness and which has a color different from the dissolution removal target region 60 to serve as a mark for the position of the dissolution removal target region 60, and the non-dissolution removal target region 80 formed in contact with the different material region 50 to cover the different material region 50. The three-dimensional shaped object 70 is obtained by removing the non-dissolution removal target region 80 by roughly removing through a technique or the like until reaching the different material region 50, and dissolving and removing the dissolution removal target region 60 with a predetermined liquid, for example, water.

For example, on the surface of the three-dimensional shaped object 70, a color layer is formed in which ink droplets of color inks having different colors from each other for coloring are ejected from the corresponding inkjet heads 16Y to 16K, where the thickness of the color layer is, for example, 0.1 mm to 0.5 mm.

Note that a white layer for reflecting light, which is ejected from the white ink inkjet head 16W and layered, may be provided on the inner side of the color layer for coloring.

The thickness of the dissolution removal target region 60 is, for example, 5 mm.

Here, curing according to a predetermined condition may mean curing by, for example, ultraviolet light irradiated from the ultraviolet light source 9 (see FIG. 1B). In addition, the curable resin which is a resin that cures according to a predetermined condition may be, for example, an ultraviolet curable resin that cures by being irradiated with ultraviolet light.

Figure 3C:
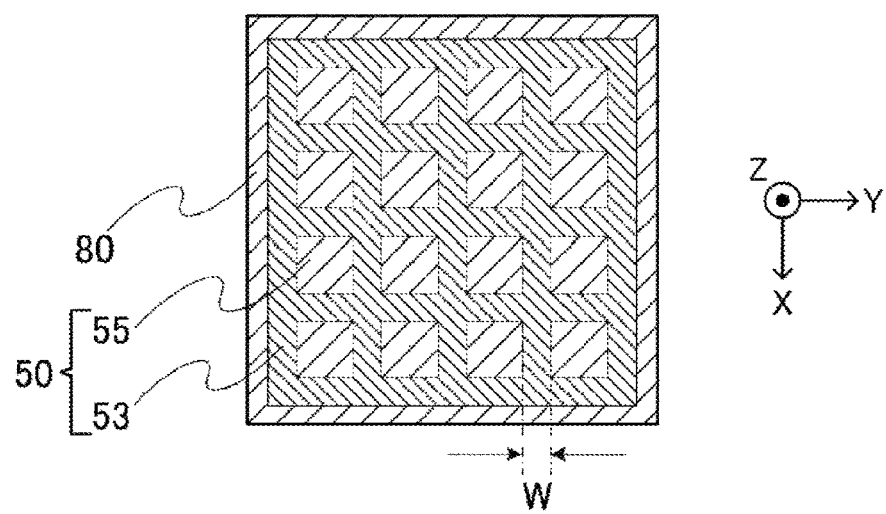
FIG. 3C is a cross-sectional view in a plane S1 of the three-dimensional shaped object.

FIG. 3C is a cross-sectional view in a plane S1 of the three-dimensional shaped object (preparation-shaped object 40). Here, details of the different material region 50 will be described.

At least a part of the different material region 50 included in the preparation-shaped object 40 including the three-dimensional shaped object 70 shaped by the three-dimensional shaping device 1 according to the present embodiment is shaped with a shaping material ink having a color different from the support material ink. More specifically, the different material region 50 is shaped with a support material ink and a shaping material ink having a color different from that of the support material ink.

The different material region 50 has a thickness of, for example, 0.1 mm to 0.5 mm, and includes a first shaping region 53 formed in a mesh form with the shaping material ink and a second shaping region 55 formed to fill the part corresponding to the opening of the mesh with the support material ink.

The width W of the first shaping region 53 is, for example, 0.3 mm to 1.0 mm, and the opening of the mesh is, for example, a rectangular void in which one side is 1 mm to 2 mm. In other words, the first shaping region 53 is, for example, a grid having 1 mm to 2 mm interval shaped by the shaping material ink, and the support material ink is ejected and layered in the opening.

In other words, the head portion 10 included in the three-dimensional shaping device 1 according to the second embodiment ejects a material having a color different from that of the support material as any material other than the support material, and the different material region 50 is a region formed with a color different from that of the dissolution removal target region 60 using a material having a color different from that of the support material and is formed as a region different from both the dissolution removal target region 60 and the non-dissolution removal target region 80 at a position between the dissolution removal target region 60 and the non-dissolution removal target region 80.

Figure 4:
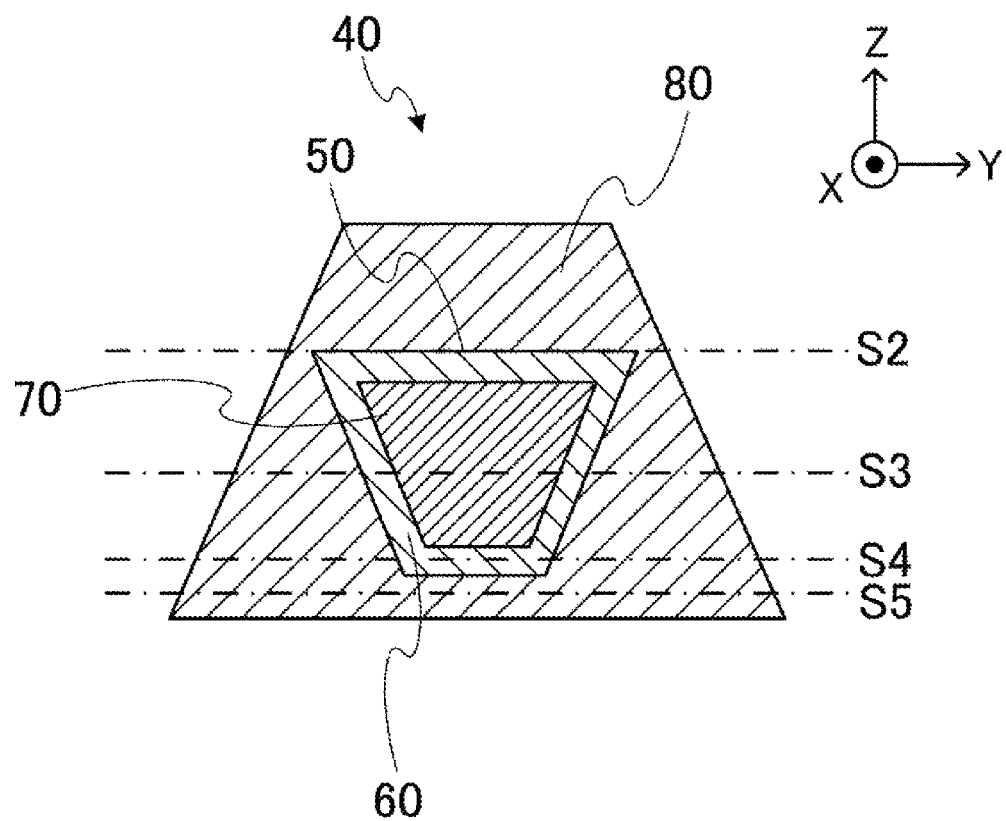
FIG. 4 is a cross-sectional view of a preparation-shaped object used when a three-dimensional shaping device according to a third embodiment of the present disclosure shapes a three-dimensional shaped object.

FIG. 4 is a cross-sectional view of a preparation-shaped object 40 used when a three-dimensional shaping device 1 according to a third embodiment of the present disclosure shapes a three-dimensional shaped object 70.

The preparation-shaped object 40 is a film-like region in which the different material region 50 is formed along at least one part of the outer side of the dissolution removal target region 60, and the non-dissolution removal target region 80 is formed to sandwich the different material region 50 with the dissolution removal target region 60.

Specifically, the preparation-shaped object 40 includes, in order from the inner side, the three-dimensional shaped object 70 formed with the shaping material ink to become the material of the three-dimensional shaped object 70 including the curable resin that cures according to a predetermined condition, the dissolution removal target region 60 which is an ink layer in contact with the three-dimensional shaped object 70 and in which the support material ink is layered to cover the three-dimensional shaped object 70 with a predetermined thickness, and the different material region 50 which is in contact with the dissolution removal target region 60 to cover the dissolution removal target region 60 with a predetermined thickness and which has a color different from the support layer to serve as a mark for the position of the dissolution removal target region 60. The non-dissolution removal target region 80 and the different material region 50 are removed from the preparation-shaped object 40, and the dissolution removal target region 60 is dissolved and removed with a predetermined liquid, for example, water to complete the three-dimensional shaped object 70.

The different material region 50 is shaped with a shaping material ink having a color different from that of the support material ink and is shaped into a film shape, where the thickness is preferably, for example, 0.1 mm to 0.5 mm.

The different material region 50 is preferably a color shaping material ink including a curable resin, and more preferably has a color having a high contrast with the color of the support material ink.

Here, curing according to a predetermined condition may mean curing by, for example, ultraviolet light irradiated from the ultraviolet light source 9 (see FIG. 1B). In addition, the curable resin which is a resin that cures according to a predetermined condition may be, for example, an ultraviolet curable resin that cures by being irradiated with ultraviolet light.

Figure 5A:
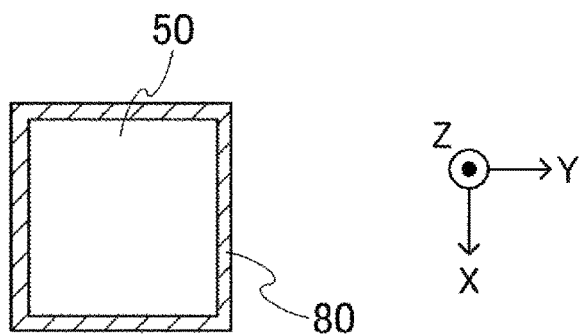
FIG. 5A is a cross-sectional view in a plane S2 of the preparation-shaped object.

FIG. 5A is a cross-sectional view in a plane S2 (see FIG. 4) of a preparation-shaped object 40 used when a three-dimensional shaping device 1 according to the third embodiment of the present disclosure shapes the three-dimensional shaped object 70. On the plane S2, the different material region 50 and the non-dissolution removal target region 80 are formed from the inner side.

Figure 5B:
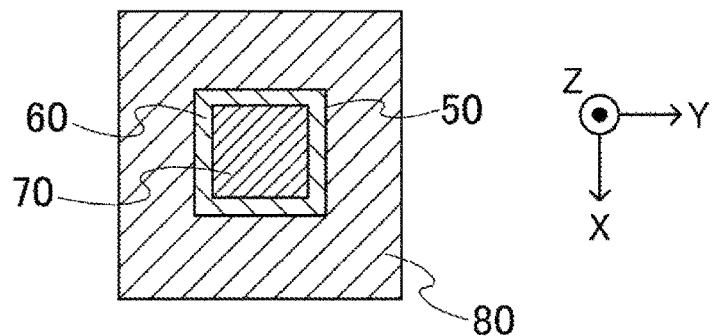
FIG. 5B is a cross-sectional view in a plane S3 of the preparation-shaped object.

FIG. 5B is a cross-sectional view in a plane S3 of the preparation-shaped object 40. In the cross section of the plane S3, a three-dimensional shaped object 70, a dissolution removal target region 60, a different material region 50, and a non-dissolution removal target region 80 are formed in order from the inner side.

Figure 5C:
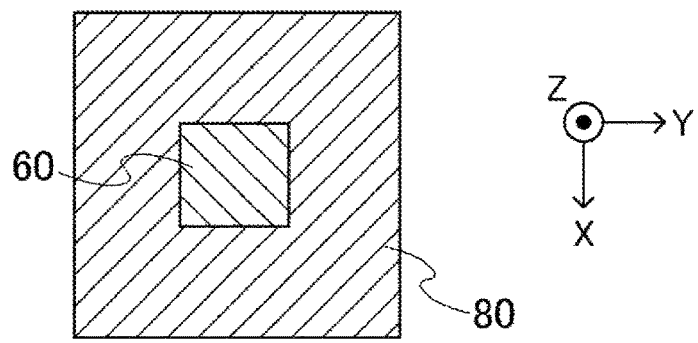
FIG. 5C is a cross-sectional view in a plane S4 of the preparation-shaped object.

FIG. 5C is a cross-sectional view in a plane S4 of the preparation-shaped object. In the cross section of the plane S3, the dissolution removal target region 60 and the non-dissolution removal target region 80 are shaped in order from the inner side.

Figure 5D:
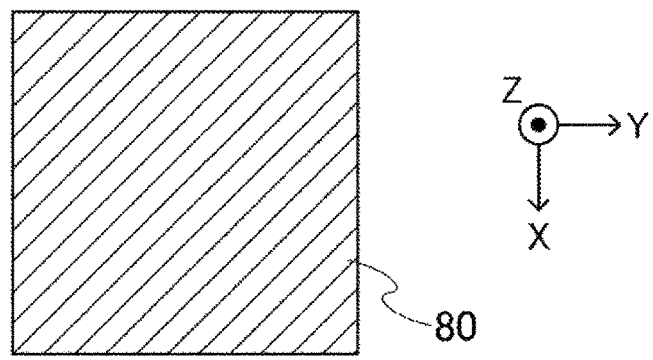
FIG. 5D is a cross-sectional view in a plane S5 of the preparation-shaped object.

FIG. 5D is a cross-sectional view in a plane S5 of the preparation-shaped object 40. The non-dissolution removal target region 80 is shaped on the cross section.

According to the three-dimensional shaping device 1 of the embodiment of the present disclosure, the position of the boundary between the dissolution removal target region 60 and the non-dissolution removal target region 80 is indicated by the different material region 50, and thus an excellent effect is obtained in that when removing the non-dissolution removal target region in the support layer by, for example, applying a physical force with a technique, rough removal can be performed while leaving the support layer thick enough to prevent an excessive force from being applied to the three-dimensional shaped object at the periphery of the three-dimensional shaped object 70, and the delicate three-dimensional shaped object 70 can be taken out from the support layer and completed in a short time.

According to the three-dimensional shaping device 1 of the embodiment of the present disclosure, the colors of the dissolution removal target region 60 which is a support layer formed at the periphery of the three-dimensional shaped object 70 so that excessive force is not applied to the three-dimensional shaped object 70 and the different material region 50 are different, so that, for example, when roughly removing up to the different material region 50 with a technique, the dissolution removal target region 60 can be distinguished and left behind. As a result, an excellent effect is obtained in that an excessive force is less likely to be applied to the three-dimensional shaped object 70, which is thereafter washed with water to remove the dissolution removal target region 60 so that a delicate three-dimensional shaped object 70 can be completed in a short time.

According to the three-dimensional shaping device 1 of the embodiment of the present disclosure, the different material region 50 is formed in a color different from the dissolution removal target region 60, and is formed as a region different from the dissolution removal target region 60 and the non-dissolution removal target region 80 at the position between the dissolution removal target region 60 and the non-dissolution removal target region 80, so that for example, when roughly removing to the vicinity of the different material region 50 with a technique, the dissolution removal target region 60 may be distinguished and left behind. As a result, an excellent effect is obtained in that an excessive force is less likely to be applied to the three-dimensional shaped object 70, which is thereafter washed with water to remove the dissolution removal target region 60 so that a delicate three-dimensional shaped object 70 can be completed in a short time.

When the three-dimensional shaped object 70 and the support layer are separated during shaping or immediately after shaping, the three-dimensional shaped object 70 may be warped and deformed. According to the three-dimensional shaping device 1 of the embodiment of the present disclosure, if the shaping material ink having a color different from that of the dissolution removal target region 60 is used, for example, as the different material region 50 at a position between the dissolution removal target region 60 and the non-dissolution removal target region 80, an excellent effect is obtained in that the three-dimensional shaped object 70 covered with the different material region 50 is less likely to be warped since the shaping material ink is harder than the support material ink.

According to the three-dimensional shaping device 1 of the embodiment of the present disclosure, when the support layer is roughly removed by physical scraping, for example, with a technique, the film-like different material region 50 can be used as a mark, and thus an excellent effect is obtained in that rough removal and removing can be carried out while leaving the support layer thick enough to prevent an excessive force from being applied to the three-dimensional shaped object with a technique at the periphery of the three-dimensional shaped object 70, and a delicate three-dimensional shaped object 70 can be taken out from the support layer and completed in a short time.

According to the three-dimensional shaping device 1 of the embodiment of the present disclosure, since the different material region 50 is at least a part of the non-dissolution removal target region 80, it has a color different from the dissolution removal target region 60 and thus may serve as a mark, whereby, for example, when roughly removing up to the vicinity of the different material region 50 with a technique, the dissolution removal target region 60 can be distinguished and left behind. As a result, an excellent effect is obtained in that an excessive force is less likely to be applied to the three-dimensional shaped object 70, which is thereafter washed with water to remove the dissolution removal target region 60 so that a delicate three-dimensional shaped object 70 can be completed in a short time.

According to the three-dimensional shaping device 1 of the embodiment of the present disclosure, the different material region 50 is formed with a color from the dissolution removal target region 60 using the support material and a material other than the support material having a color different from the support material, so that the boundary between the non-dissolution removal target region 80 and the dissolution removal region 60 becomes clear, and for example, when roughly removing up to the vicinity of the different material region 50 with a technique, the position of the dissolution removal target region 60 can be distinguished and left behind. As a result, an excellent effect is obtained in that an excessive force is less likely to be applied to the three-dimensional shaped object 70, which is thereafter washed with water to remove the dissolution removal target region 60 so that a delicate three-dimensional shaped object 70 can be completed in a short time.

Figure 6:
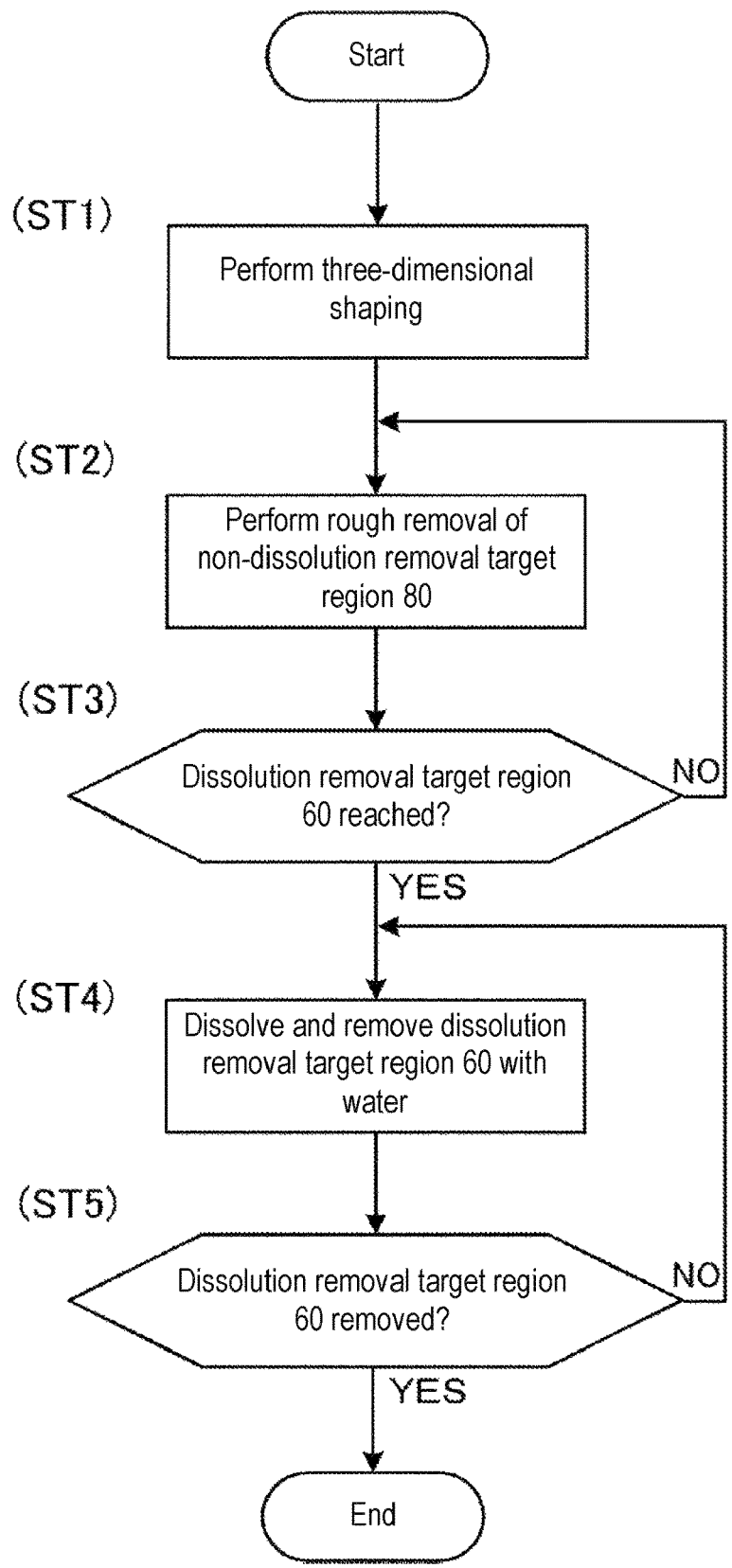
FIG. 6 is a flowchart showing steps of a manufacturing method for a three-dimensional shaped object according to the fourth embodiment of the present disclosure.

FIG. 6 shows a flowchart showing the steps of a manufacturing method for the three-dimensional shaped object according to a fourth embodiment of the present disclosure.

First, the three-dimensional shaping device 1 shapes the three-dimensional shaped object 70 shaped through the layered shaping method using a curable resin, which is resin that cures according to a predetermined condition, the three-dimensional shaped object being a preparation-shaped object which is a shaped object including, in order from the inner side, a three-dimensional shaped object formed with the shaping material ink to become the material of the three-dimensional shaped object including curable resin, the dissolution removal target region 60 which is an ink layer in contact with the three-dimensional shaped object and in which the support material ink is layered to cover the three-dimensional shaped object with a predetermined thickness, and the non-dissolution removal target region 80 in contact with the dissolution removal target region to cover the dissolution removal target region with a predetermined thickness and having a color different from the support layer enabling the boundary between the dissolution removal target region 60 and the non-dissolution removal target region to be visible (step ST1).

Here, curing according to a predetermined condition may mean curing by, for example, ultraviolet light irradiated from the ultraviolet light source 9 (see FIG. 1B). In addition, the curable resin which is a resin that cures according to a predetermined condition may be, for example, an ultraviolet curable resin that cures by being irradiated with ultraviolet light.

The dissolution removal target region 60 is preferably shaped with a support material ink that dissolves in a predetermined liquid, for example, water. Furthermore, it is considered that the non-dissolution removal target region 80 is specifically formed by simultaneously ejecting the shaping material ink having a color different from the support material ink and the support material ink, or simultaneously ejecting the color ink having a color different from the support material ink and the support material ink.

Next, the removal (rough removal) of the non-dissolution removal target region 80 is performed with a technique or the like (step ST2). Next, whether or not the non-dissolution removal target region 80 has been removed and the vicinity of the dissolution removal target region 60 has been reached is confirmed (step ST3). When the vicinity of the dissolution removal target region 60 is reached (YES side of step ST3), the preparation-shaped object 40 is immersed in water, and the dissolution/removal of the dissolution removal target region 60 is carried out (step ST4). When the non-dissolution removal target region 80 has not been completely removed and the dissolution removal target region 60 has not been reached (NO side of step ST3), further removal (rough removal) of the non-dissolution removal target region 80 is continued. When the dissolution removal target region 60 is dissolved and removed by immersing the preparation-shaped object 40 in water, the operation is completed, and the three-dimensional shaped object 70 which is the final resultant can be obtained (YES side of step ST5). When the dissolution removal target region 60 has not been completely dissolved and removed, the preparation-shaped object 40 is further immersed in water for a long time (NO side of step ST5).

According to the manufacturing method for a three-dimensional shaped object of the embodiment of the present disclosure, the position of the boundary between the dissolution removal target region 60 and the non-dissolution removal target region 80 can be visually recognized, and thus an excellent effect is obtained in that when removing the support layer by applying a physical force with a technique, for example, rough removal can be performed while leaving the support layer thick enough to prevent an excessive force from being applied to the three-dimensional shaped object 70 at the periphery of the three-dimensional shaped object 70, and the delicate three-dimensional shaped object 70 can be taken out from the support layer and completed in a short time.

Figure 7:
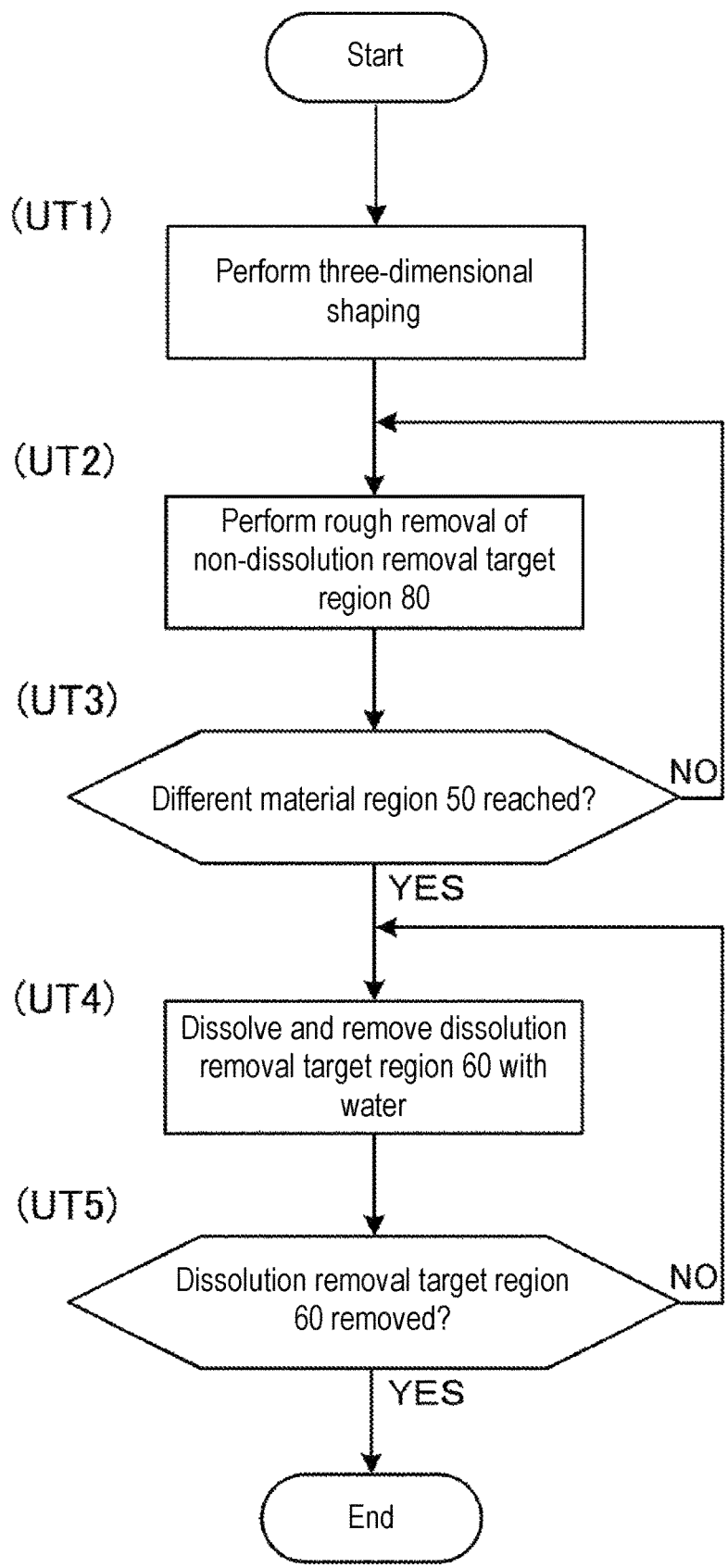
FIG. 7 is a flowchart showing steps of a manufacturing method for a three-dimensional shaped object according to the fifth embodiment of the present disclosure.
Figure 8A:
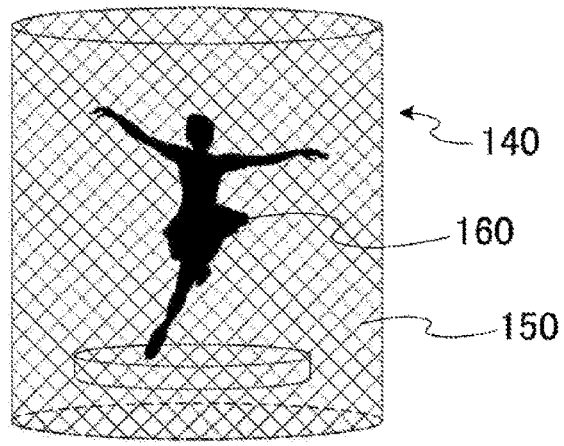
FIG. 8A is an explanatory view of a three-dimensional shaped object shaped by being supported by a support layer.
Figure 8B:
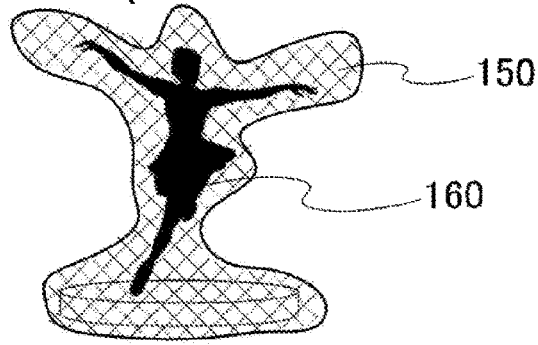
FIG. 8B is explanatory view showing a mode in which the support layer is roughly removed.
Figure 8C:
FIG. 8C is an explanatory view of the three-dimensional shaped object which is a final resultant in which all the support layers are removed.
Figure 8D:
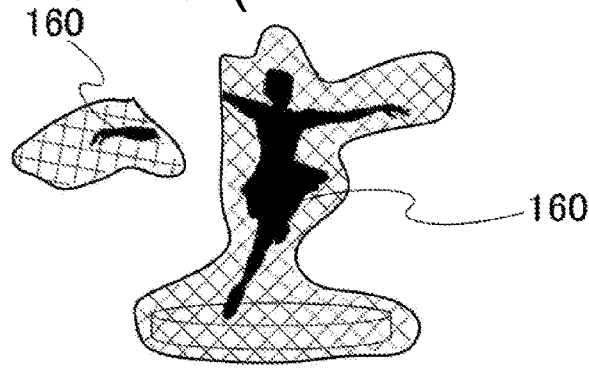
FIG. 8D is an explanatory view showing a situation where an excessive force was applied to the delicate part and was damaged when roughly removing the support layer.

FIG. 7 shows a flowchart showing the steps of a manufacturing method for the three-dimensional shaped object according to a fifth embodiment of the present disclosure.

First, the three-dimensional shaping device 1 shapes a shaped object shaped through the layered shaping method using a curable resin, which is resin that cures according to a predetermined condition, the shaped object being a preparation-shaped object 40 which is a shaped object including, in order from the inner side, a three-dimensional shaped object 70 formed with the shaping material ink to become the material of the three-dimensional shaped object including curable resin, the dissolution removal target region 60 which is an ink layer in contact with the three-dimensional shaped object and in which the support material ink is layered to cover the three-dimensional shaped object 70 with a predetermined thickness, a different material region 50 which is in contact with the dissolution removal target region 60 to cover the dissolution removal target region 60 with a predetermined thickness and has a color different from the dissolution removal target region 60 enabling the boundary between the non-dissolution removal target region 80 and the dissolution removal target region 60 to be visible, and a non-dissolution removal target region 80 which is an ink layer in contact with the different material region 50 and in which the support material ink is layered to cover the different material region 50 with a predetermined thickness (step UT1).

Here, curing according to a predetermined condition may mean curing by, for example, ultraviolet light irradiated from the ultraviolet light source 9 (see FIG. 1B). In addition, the curable resin which is a resin that cures according to a predetermined condition may be, for example, an ultraviolet curable resin that cures by being irradiated with ultraviolet light. Moreover, it is preferable that the support layer is shaped with an ink for a support material that dissolves in water.

Next, the removal (rough removal) of the non-dissolution removal target region 80 is performed with a technique or the like (step UT2). Next, whether the non-dissolution removal target region 80 is removed and the different material region 50 is reached is confirmed (step UT3). At this time, the fact that the different material region 50 has a color different from the non-dissolution removal target region 80 becomes an indication. When the different material region 50 is reached (YES side of step UT3), the preparation-shaped object 40 is immersed in water and the dissolution removal target region 60 is dissolved and removed (step UT4). When the non-dissolution removal target region 80 has not been completely removed and the different material region 50 has not been reached (NO side of step UT3), further removal (rough removal) of the non-dissolution removal target region 80 is continued. When the dissolution removal target region 60 is dissolved and removed by immersing the preparation-shaped object 40 in water, the operation is completed, and the three-dimensional shaped object 70 which is the final resultant can be obtained (YES side of step UT5). When the dissolution removal target region 60 has not been completely dissolved and removed, the preparation-shaped object 40 is further immersed in water for a long time (NO side of step UT5).

In a case where the different material region 50 is formed with a shaping material ink that does not dissolve in water and is in the form of a film and is completely covering the dissolution removal target region 60, the different material region 50 is desirably removed at least partially to allow water to permeate into the dissolution removal target region 60.

Furthermore, in the different material region 50, for example, when one part of the different material region 50 is shaped with the shaping material ink and has a grid shape and the opening of the grid is filled with the support material ink as with the preparation-shaped object 40 used when the three-dimensional shaping device 1 according to the third embodiment of the present disclosure shapes the three-dimensional shaped object 70, it goes without saying that the water naturally permeates into the dissolution removal target region 60 thus dissolving and removing the dissolution removal target region 60.

According to the manufacturing method for a three-dimensional shaped object according to the fifth embodiment of the present disclosure, the different material region 50 can be used as a mark when removing the non-dissolution removal target region 80 with a technique, and thus an excellent effect can be obtained in that rough removal can be performed while leaving the support layer thick enough to prevent an excessive force from being applied to the three-dimensional shaped object 70 with a technique at the periphery of the three-dimensional shaped object 70, and the delicate three-dimensional shaped object 70 can be taken out from the support layer and completed in a short time.

The three-dimensional shaping device and the manufacturing method for the three-dimensional shaped object of the present disclosure are not limited to the above-described embodiments, and various modifications may, of course, be made within a scope not deviating from the gist of the present disclosure.

For example, as a modified embodiment, when the different material region is shaped to cover the dissolution removal target region, it is conceivable to provide a separation layer between the different material region and the dissolution removal target region. The different material region thus can be easily peeled from the dissolution removal target region.

Specifically, when using the color ink and the support material ink in shaping the different material region, it is conceivable to reduce the proportion of the color ink in the boundary between the different material region and the dissolution removal target region. It is also conceivable to provide several ink layers with high surface tension as the separation layer.

What is claimed is:

1. A manufacturing method for a three-dimensional shaped object for manufacturing a three-dimensional shaped object, comprising:
    a shaping step of causing a head portion, which ejects a material used for shaping the three-dimensional shaped object, to perform shaping of the three-dimensional shaped object; wherein
    the head portion ejects, as the material,
        a shaped object material which is the material used for forming the three-dimensional shaped object, and
        a support material which is a material used for forming a support layer that supports at least a part of the three-dimensional shaped object being shaped;
    the support material is a material that dissolves in a predetermined liquid;
    in the shaping step, the head portion is caused to form the three-dimensional shaped object using the shaped object material, and to form the support layer using the support material,
    wherein the support layer includes:
        a dissolution removal target region, being formed at a periphery of at least one part of the three-dimensional shaped object, and
        a non-dissolution removal target region, being formed at a periphery of at least one part of the dissolution removal target region; and
        a different material region, being formed between the dissolution removal target region and the non-dissolution removal target region, and the dissolution removal target region being provided on a side of the three-dimensional shaped object of the different material region;
    wherein the different material region is formed by using a material having a color different from that of the support material;
    after removing the non-dissolution removal target region to a vicinity of the different material region by a method other than dissolution, the dissolution removal target region is removed by dissolving in the predetermined liquid.

2. The manufacturing method for the three-dimensional shaped object according to claim 1, wherein
    the non-dissolution removal target region is removed by bringing an object harder than the non-dissolution removal target region into contact with the non-dissolution removal target region and applying a physical force.

3. The manufacturing method for the three-dimensional shaped object according to claim 1, wherein
    the different material region is formed in the color different from the dissolution removal target region, so that a boundary between the dissolution removal target region and the non-dissolution removal target region is in a visible state.

4. The manufacturing method for the three-dimensional shaped object according to claim 3, wherein
    the head portion ejects the material having the color different from the support material as any material other than the support material; and
    the different material region is a region formed in the color different from the dissolution removal target region using the material having the color different from the support material, and is formed at a position between the dissolution removal target region and the non-dissolution removal target region as a region different from both the dissolution removal target region and the non-dissolution removal target region.

5. The manufacturing method for the three-dimensional shaped object according to claim 4, wherein
    the different material region is formed in the color different from the dissolution removal target region by being formed using the material having the color different from the support material without using the support material.

6. The manufacturing method for the three-dimensional shaped object according to claim 4, wherein
    the different material region is a film region formed along at least a part of the outer side of the dissolution removal target region; and
    the non-dissolution removal target region is formed to sandwich the different material region with the dissolution removal target region.

7. The manufacturing method for the three-dimensional shaped object according to claim 5, wherein the different material region is a film region formed along at least a part of the outer side of the dissolution removal target region; and the non-dissolution removal target region is formed to sandwich the different material region with the dissolution removal target region.

8. The manufacturing method for the three-dimensional shaped object according to claim 3, wherein
the different material region is at least one part of the non-dissolution removal target region.

9. The manufacturing method for the three-dimensional shaped object according to claim 8, wherein
the head portion ejects the material having the color different from the support material as any material other than the support material; and the different material region is formed in the color different from the dissolution removal target region by being formed using the support material and the material having the color different from the support material.

* * * * *